Feb. 7, 1961 E. H. YONKERS 2,970,388
EDUCATION DEVICE
Filed May 7, 1956 2 Sheets-Sheet 1
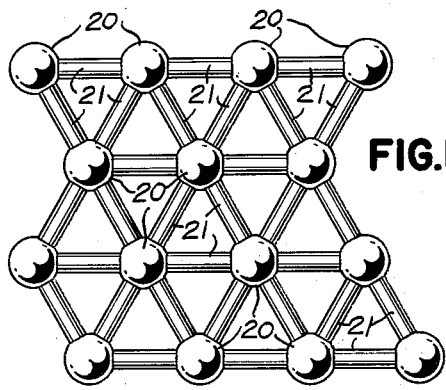
FIG.1
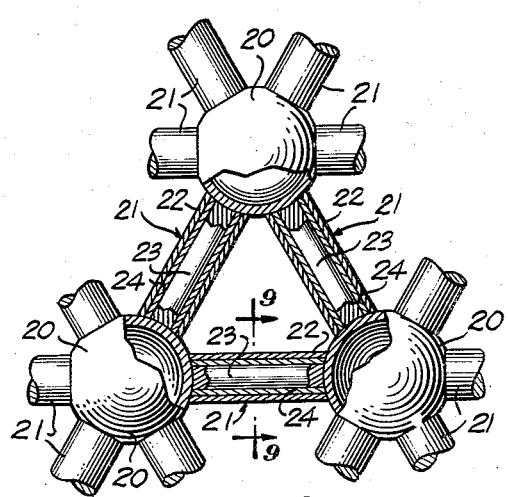
FIG.2
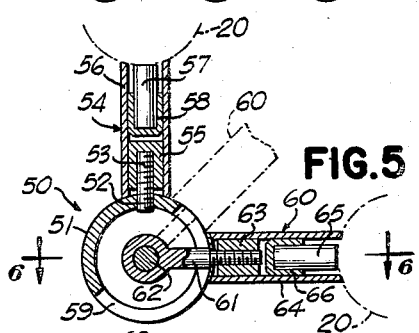
FIG.5
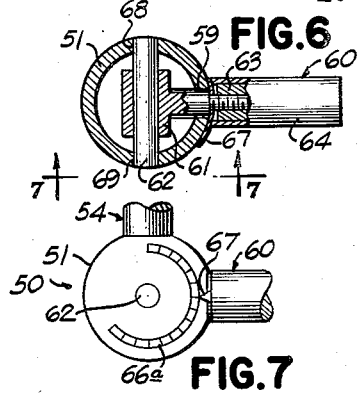
FIG.6
FIG.7
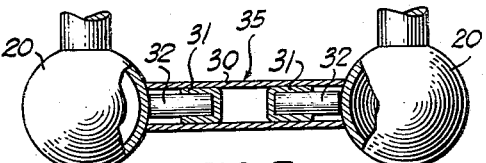
FIG.3
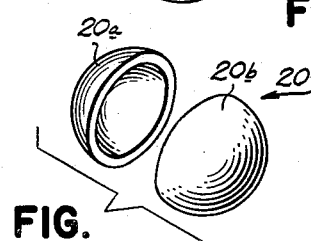
FIG.8
FIG.9
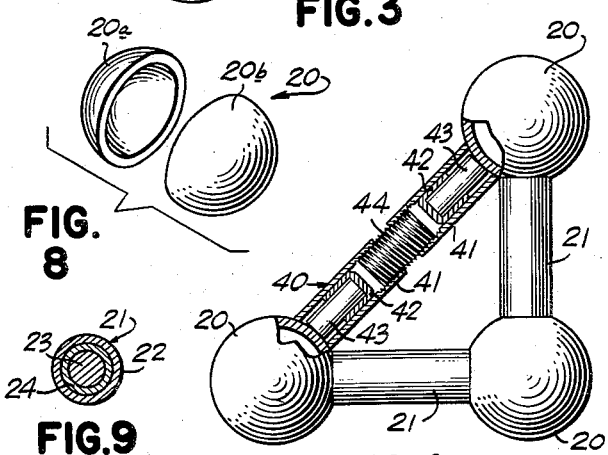
FIG.4
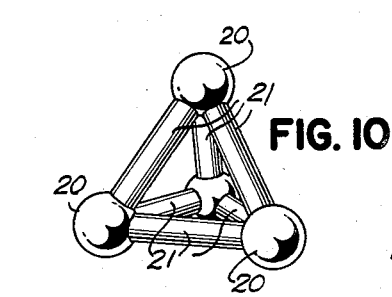
FIG.10
Inventor
EDWARD H. YONKERS
by
Mason, Kolehmainen, Rathburn and Wyss.
Attorneys Feb. 7, 1961  E. H. YONKERS  2,970,388
EDUCATION DEVICE
Filed May 7, 1956  2 Sheets-Sheet 2
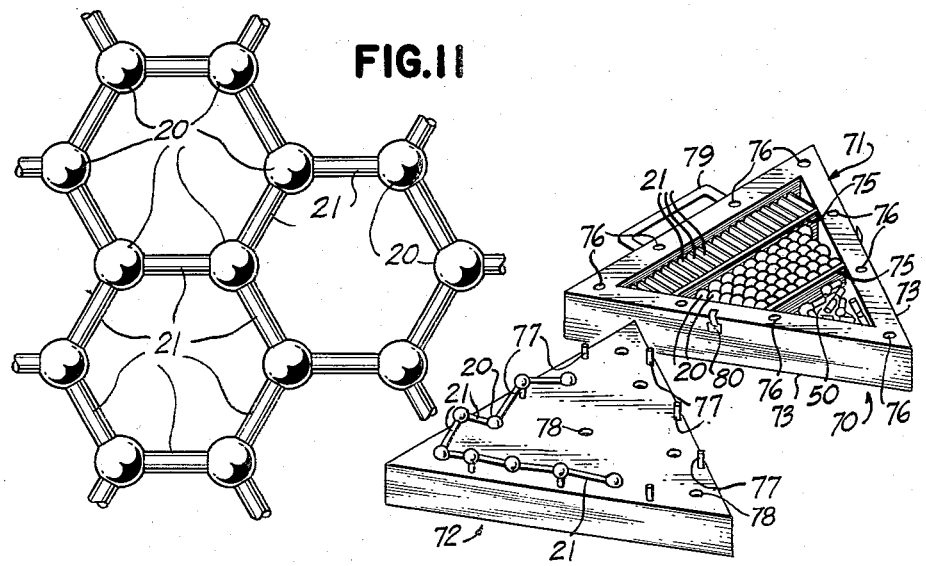
FIG. 11
FIG. 12
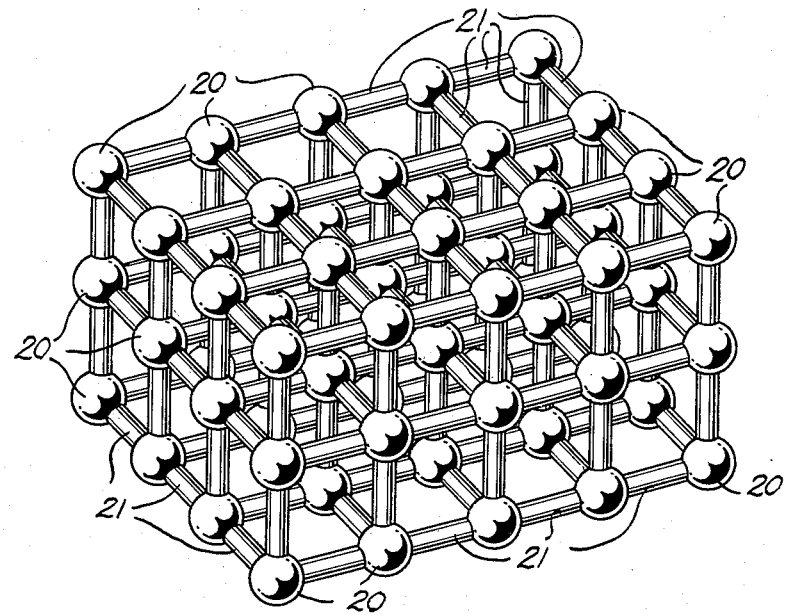
FIG. 13
Inventor
EDWARD H. YONKERS
by
Mason, Kolehmainen, Rathburn and Wyss
Attorneys

United States Patent Office 2,970,388
Patented Feb. 7, 1961

2,970,388

EDUCATION DEVICE

Edward H. Yonkers, 757 Bluff St., Glencoe, Ill.

Filed May 7, 1956, Ser. No. 583,048

6 Claims. (Cl. 35—18)

The present invention relates to an education device and, more particularly, to apparatus for building crystallographic structures or the various planar or three dimensional geometric configurations in order to facilitate a study and analysis of their geometric properties.

As an educational technique for studying chemical crystals occurring either naturally or synthetically there have heretofore been devised various types of devices for building prototypes of these crystalline structures. The crystals usually comprise a plurality of unit cells combinable in particular ways to form lattice structures in either two or three dimensional arrays. The cells, in turn, represent groups of atoms maintained in predetermined spaced relationship by polar or non-polar bonds. It is evident that a device for simulating such crystals should have component parts characteristic of these atoms and bonds. The devices heretofore used for the described purpose are rather complex and require time-consuming operations in building the prototype crystals because of the complicated mechanical means employed for assembling the component parts.

It would therefore be desirable to provide an educational device for constructing prototypes of crystalline or geometric structures having component parts easily and quickly assemblable or disassemblable. It would further be advantageous to employ component parts representative of the atoms and bonds which may be movable relative to one another without disengagement but which facilitate easy and quick assembly or disassembly. Accordingly, it is an object of the present invention to provide a new and improved educational device characterized by these desirable features.

It is another object of the present invention to provide an educational device for building crystallographic structures in either two or three dimensions to facilitate their study and analysis.

It is still another object of the present invention to provide an educational device for building a geometric structure in either two or three dimensions embodying component parts maintained fixed distances apart but movable with respect to each other in order to facilitate the construction of the geometric structure.

A further object of the present invention is to provide an educational device for building a prototype of a crystallographic structure including a plurality of simulated atoms and interconnecting simulated bonds wherein said atoms are maintained in fixed relative relationship, yet are quickly and easily assembled and disassembled.

Still a further object of the present invention is to provide an educational device for simulating a crystalline structure wherein the atoms thereof are disposed and maintained in fixed and selective spaced relationship.

Yet a further object of the present invention is to provide a means for storing and transporting an educational device and adaptable to be used as a support for a prototype of a geometric configuration.

Another object of the present invention resides in a new and improved method of manufacturing an interconnecting bar for an educational device of the character described above.

The invention both as to its organization and method of operation, together with further objects and advantages thereof, will best be understood by reference to the following detailed description taken in conjunction with the accompanying drawings wherein:

Fig. 1 is a plan view of a two dimensional geometrical structure built with an educational device embodying the features of the present invention, illustrating spheres and interconnecting rods;

Fig. 2 is an enlarged fragmentary view of the structure of Fig. 1, shown with a portion of the spheres and interconnecting bars broken away;

Fig. 3 is a plan view, shown partially broken away, of a portion of another geometric structure built with the component parts of the present educational device, illustrating a modified construction of the interconnecting bars of Fig. 1;

Fig. 4 is a plan view, shown partially broken away, of still another geometric structure built with the component parts of the educational device of the present invention, illustrating still another modification of the interconnecting bars which, in this case, are variable in length;

Fig. 5 is a sectional view of a combined sphere and bar unit included in the present educational device;

Fig. 6 is a sectional view, taken along lines 6—6 of Fig. 5, assuming that the entire unit had been shown;

Fig. 7 is a partly sectional view looking in the direction of the arrows 7—7 in Fig. 4, assuming the entire structure had been shown;

Fig. 8 is an exploded view of the sections of a sphere which is one of the component parts of the present educational device;

Fig. 9 is a sectional view illustrating one of the interconnecting bars and taken along lines 9—9 of Fig. 2, assuming again that the entire structure of the bar had been shown in the latter;

Fig. 10 is a perspective view of a three dimensional geometric structure, namely a tetrahedron, built with the present educational device;

Fig. 11 is a plan view of a two dimensional prototype of a layer of the graphite crystalline structure built with the present educational device of Fig. 1;

Fig. 12 is a perspective view of the disassembled receptacle and its cover for storing and transporting the component parts of the present educational device, with the cover being shown when used as a support for a simulated crystal; and Fig. 13 is a perspective view of a three dimensional prototype of a salt crystal built with the present educational device.

To accomplish the above-recited and other objects, there has been provided, in accordance with the present invention, an educational device for building prototypes of the various crystallographic structures and for constructing either two or three dimensional geometric configurations. The educational device comprises a plurality of magnetically attractive spheres and interconnecting magnetic bars respectively representative of atoms and bond linkages in the crystal prototype, and representative of boundary corners and boundary edges in the geometrical configurations. The bars house magnetic material for attracting and holding the spheres in preselected spaced apart relationship and in engagement with the opposed ends of the bars while permitting the bars to be moved over the surface of the spheres, whereby the assembly of the structure under study is facilitated. In order to increase the geometric stability of the structure, there are also provided elongated magnetic bars of variable length together with combination units each including a sphere having a pair of bars secured thereto. The variable length bars function to provide diagonal interconnecting linkages while the combination units provide fixed angular interconnecting linkages which find particular use in the simulation of fixed angular bonds of crystalline structures. It will be appreciated that the many prototypes of crystalline structures or the various types of geometric constructions may be accurately and precisely simulated by the present educational device, the various arrangements being susceptible to ready assembly and disassembly by virtue of the magnetic elements forming the component parts of the device.

Referring now to the drawings, and more particularly to Fig. 1, there is illustrated a two dimensional geometric configuration built by employing only two of the component elements of the present educational device. These elements include a plurality of magnetically attractive spheres 20 disposed in predetermined spaced relationship and interconnected by a plurality of magnetic bars 21 so arranged as to define a plurality of adjacent two dimensional triangles. It will be appreciated that any number of the magnetically attractive spheres or spherical members 20 having identical diameters and interconnecting bars 21 having identical lengths may be used to build a geometric configuration of two or three dimensions or to build a prototype of any of the numerous crystallographic structures occurring in nature embodying non-polar or valued bonds in nature as well as polar or ionic bonds.

In accordance with customary practice in the field of chemistry, the various crystals are represented by particular lattice structures, e.g., the cubic lattice and hexagonal lattice. The lattices are formed by a plurality of unit cells comprising a combination of the fewest number of atoms necessary to identify the crystal. The simplest lattice is the cubic, of which there are three types, viz., the simple cubic lattice, the body-centered cubic lattice, and the face-centered cubic lattice. In the simple cubic lattice the unit cell has eight atoms at its corners; in the body-centered cubic lattice there is one additional atom a the center of the cube, and in the face-centered cubic lattice there are six atoms at the centers of the faces of th simple cubic lattice. The body-centered lattice may be produced by the interpenetrtaion of two simple cubic lattices in such a way that the corners of one lattice occupy the centers of the cubes of the second. In each unit cell of the body-centered type of lattice there are $1+8/8=2$ atoms, while the unit cell of the simple cubic lattice contains $8/8=1$ atom. The face-centered lattice can be formed from three simple cubic lattices arranged so that the centers of the faces in each unit cube are occupied; this unit cell then contains $8/8+6/2=4$ atoms. These exemplary lattice networks are the general types of chemical structures adapted to be constructed with the present eductaional device.

Considering now the magnetically attractive spheres 20 in greater detail, and referring particularly to Figs. 1, 2 and 8, they comprise a pair of hollow hemispheres, as best shown in Fig. 8, formed in a punch press or the like and resistance welded together to form a rough sphere. The rough sphere is then subjected to a grinding operation to provide a smooth, highly polished sphere of substantially perfect, spherical dimensions. In an educational device built in accordance with the features of the present invention, the spheres 20 were manufactured from a magnetically attractive material of either iron or mild steel of ⅛ inch thickness and had a diameter of one inch within a tolerance of two thousandths of an inch. As previously indicated, these spheres 20 are used to represent, in crystallographic structures, the various atoms disposed in spaced relationship from one another, and in two or three dimensional geometric configurations, the particular corners identifying a part of the boundary shape thereof.

In order to dispose the plurality of spheres in predetermined, spaced relationship there are provided a plurality of elongated bars 21 of uniform, predetermined length housing magnetic material. This magnetic material functions to attract and retain one of the spheres 20 in engagement with each end of the bars 21. More particularly, and in accordance with an important feature of the present invention, the elongated bars 21, as illustrated in Figs. 2 and 9, may comprise an outer, cylindrically shaped, sheath 22 of magnetically attractive material, such as iron or mild steel, for housing a magnet 23 concentrically disposed within the sheath 22 and isolated therefrom by means of a cylindrical sleeve 24 of non-magnetic material such as aluminum or brass, also referred to hereinafter as either spacing or seating means. The magnets 23 are preferably "Alnico." The sleeve 24, in addition to positioning the magnet within the sheath, functions to concentrate the magnetic flux lines at the ends of the bar 21 in order to obtain maximum magnetic attraction for the spheres 20 and to avoid the magnetic influence of the interconnecting bars 21 one upon the other. The magnet 23, sleeve 24 and sheath 22 are maintained in assembly by successively press fitting one upon the other to form the composite bar 21. The ends of the bar thus formed are ground to form a concave surface conforming to the surface of the sphere 20 in order to provide for flush seating and magnetic engagement of the sphere 20 with the bar 21. In this manner, due to the localization of the magnetic forces at the ends of the bars 21, the bars 21 strongly adhere to the surface of the spheres 20 but yet are freely movable over the surfaces thereof. Hence, in use, the sphers 20 and the intrconnecting bars 21 may be assembled and the bars 21 moved relative to the spheres 20 until a position of stability is determined or until a desired configuration is obtained.

In an educational device built in accordance with the features of the present invention, the length of the interconnecting bars was $1\pm.002$ inch, measured between the opposed centers of their concave ends. It is imperative that the accuracy of the interconnecting bars 21 and spheres 20 be exceptionally high so that the crystalline structures or geometric figures will be quantitatively perfect. It has been determined that the diameter of the spheres 20 and the length of the bars 21, measured from the center of their concave spherical ends, should not deviate more than a few tenths of a percent from the standard size in order to provide stable and highly precise structures.

It should be apparent that a proper assembly of the spheres 20 and interconnecting bars 21 readily yield various geometric configurations comprising either a single three dimensional figure, as for example the tetrahedron illustrated in Fig. 10, or a compound (repetitive single), three dimensional figure, for example the compound cube illustrated in Fig. 13. Manifestly, the spheres 20 and interconnecting bars 21 may be readily assembled to provide all of the right polyhedron as well as many of the compound polyhedron such as the cuboctahedron.

Furthermore, as evidenced by the foregoing discussion, the present educational device may be used to construct prototypes of various crystalline structures. For example, as best shown in Fig. 11, a prototype for a simple, two dimensional structure such as a layer of the graphite crystal, may be built and the relative positions of the carbon atoms may be studied and analyzed. Furthermore, the educational device may be used to build a prototype of the simple cubic lattice illustrating the salt crystal, as shown in Fig. 13.

In the event that a study and analysis is to be made of either body or face-centered cubic lattices of the type previously discussed, including diagonal interconnecting linkages, interconnecting bars with other than one fixed preselective length might be required. To this end, and as best shown in Fig. 4, there is provided a magnetic bar 40 embodying means for adjusting its effective length.

The interconnecting bar 40 comprises a pair of sheaths 41 each accommodating a ferrule or cap 42 which, in turn, houses a magnet 43. The ferrule 42 and, of course, the seated magnet 43, is press fitted into the sheath 41 at such distance that the free end of the sheath and the outer end of the magnet each engage the surface of the sphere 20. In order to provide for adjustability of the length of the interconnecting bar 40, the centrally disposed end of each of the sheaths 41 is internally threaded to accommodate screw means 44. Longitudinal movement of the sheaths to adjust the length of the bar 41 is, of course, effected by rotating either or both of the sheaths upon the screw 44.

If it is desired empirically to determine the length of the diagonal as shown in Fig. 4, the interconnecting bar 40 may be inserted in the position shown and one of the sheaths 41 rotated until a snug fit is achieved, whereby, upon removal of the bar, its diagonal length may be measured by conventional means. Moreover, the interconnecting bar 40 may be used as diagonal bracing to provide stability for the various crystalline prototypes or geometrical configurations.

Referring now to Figs. 5, 6 and 7, there is illustrated another component element of the present educational device, which may be termed a combination unit 50, and which comprises a sphere 51 and pair of interconnecting bars 54 and 60. The principal function of this unit is either to measure the angular relationship of diagonal and adjacent interconnecting bars or to dispose three spheres in fixed spaced apart relationship, e.g., in the body or face-centered crystals referred to above involving fixed angular bonds. More particularly, the wall of the sphere 51 is provided with an aperture 52 for accommodating a stud 53 which is, in turn, threadedly connected to a plug 55 press fitted into a sheath 56 forming the main body portion of the interconnecting bar 54. The free end of the sheath 56 receives a ferrule or cap 58 which seats a magnet 57 at such distance from the end of the sheath that the magnet 57 and the sheath 56 each engage the outer surface of one of the spheres 20.

To achieve the functions of the unit 50 described above, there is provided a revolvable interconnecting bar 60 pivotally attached at the center of the sphere 51 and extending through an elongated slot 59 in the wall of the sphere. To this end, the inwardly disposed end of a connector 61 includes an enlarged annular boss encircling and pivotally mounted upon a pivot pin 62 having its opposed ends carried within apertures 68 and 69 in the wall of the sphere 51. The outwardly disposed end of the connector 61 is threaded into a plug 63 press fitted into a sheath 64. Within the free end of the sheath 64 there is press fitted a ferrule 66 carrying a magnet 65 which is positioned relative to the sheath so that the ends of both the magnets and sheath 64 engage the surface of another of the spheres 20. The revolvable bar 60 is adapted to be moved from the position indicated by broken lines in Fig. 5 to a position 180° displaced therefrom, and may assume any position intermediate these extremities, as indicated in full lines in Fig. 5. In order fixedly to maintain the bar 60 in any of the positions which it may assume, the sheath 64 may be turned to thread the plug 53 onto the connector 61 until the inner end of the bar 60 frictionally engages the surface of the sphere 51. As best shown in Fig. 7, a scale 66a on the sphere 51 and a pointer 67 fixedly secured to the connector 61 cooperate to indicate the angular relationship between the interconnecting bars 54 and 60.

When used as a measuring instrument, the unit 50 may be inserted into an array of spheres and interconnecting bars and the interconnecting bar 60 revolved until an angular fit is achieved. The interconnecting bar 60 may then be tightened against the surface of the sphere 51 by rotating the sheath 65 in the manner described above whereupon the unit 50 may be extracted from the structure. The angular relationship between the interconnecting bars 54 and 60 may readily be determined by reference to the scale 66a. When used as a stabilizing means, the unit 50 may simply be inserted in an array and the interconnecting bar 60 revolved and tightened and left in position as part of the structure.

It should be apparent that the variable length bar 40 and the combination unit 50 may be utilized with the simple spheres 20 and interconnecting bars 21 of preselective length in the construction of more complex prototype-studies of the complex natural crystal structures or geometrical configurations.

Another embodiment of the interconnecting bars of fixed preselective length is illustrated in Fig. 3 wherein there is provided a bar 35 comprising a sheath 30 adapted to accommodate seating means including a pair of ferrules or caps 31 in press fit relation. The ferrules or caps 31, as described hereinbefore, function to seat and concentrically align a pair of magnets 32 located at opposed ends of the sheath 30. As in the case of the bars 21 previously described, the ends of both the sheath 31 and the magnets 32 may be ground to form a concave surface conforming to the surface of the sphere 20 or, alternatively and preferably, only the ends of the sheath may be ground, as shown in Figs. 3 and 4. By grinding only the relatively soft sheath, the expensive and time consuming operation of grinding the hard Alnico magnets is eliminated. It will be appreciated that, by grinding only the sheaths 31 to conform to the surface of the sphere 20, an effective engaging seat is nevertheless obtained. However, to obtain a good magnetic connection it is necessary that the ferrule 31 be disposed within the sheath 31 at such distance that the magnet will be in tangential engagement with the sphere when the bar 35 is assembled to one of the spheres 20.

In accordance with a method of manufacturing the embodiment of the interconnecting bar of fixed preselected length immediately described above, the variable length interconnecting bars and the interconnecting bars of the combination unit, the hollow cylindrical sheath is first formed from a magnetically attractive material, preferably iron or mild steel. The ends of the sheath are then ground conformably to the surface of the sphere 20 to provide for a flush seating engagement, as described above. Next, the ferrules are formed in a cup-shaped configuration from a magnetically attractive material, such as iron or mild steel. The outside diameter of each ferrule is substantially equal to the inner diameter of the sheath to provide a press fit therebetween, and its inner diameter is substantially equal to the outside diameter of a magnet to provide a snug seat therefor. Next, a magnet of preselected length is seated into the ferrule and the ferrule and magnet are, in turn, inserted as a unit into the end of the sheath until the free end of the magnet is disposed within the end of the sheath. The space between the magnet and the sheath may, if desired, be filled with a non-magnetic fusible material (not shown) to further increase the rigidity and stabilize the alignment of the magnet.

In accordance with another important feature of the present invention, there is provided, as shown in Fig. 12, a carrying case 70 comprising a generally triangular hollow receptacle 71 and a correspondingly shaped cover 72 maintained together by a latch 80. The receptacle 71 includes three vertically disposed walls 73 suitably secured together to define a triangular recess 74 which is subdivided into three sections by partitions 75. As shown, one section is adapted to house the elongated bars 21, another houses the spheres 20 and the third may house the elongated bars 40 (not shown) and the combination units 50.

To facilitate carrying the case 70, a handle 79 is suitably secured to one of the walls 73. Defined in the upper portions of the walls 73 are a plurality of spaced holes 76 adapted to receive a plurality of correspondingly spaced posts 77 formed on the cover 72. Spaced between the posts 77 and in aligned relationship thereto are a plurality of shallow recesses 78 of sufficient depth to receive and hold one of the spheres 20. The top ends or exposed upper surfaces of the posts 77 are shaped similarly to conform to the surface of the sphere 20. Moreover, the height of the posts 77 is uniform and is preselective such that the spheres 20, when disposed on the posts 77 and in the recesses 78, may be interconnected by the elongated bars 21 of fixed length. In an educational device built in accordance with the present invention, the posts 77 and recesses 78 were spaced as shown in Fig. 12 and, more specifically, the centers of the posts 77 and recesses 78, respectively, were spaced apart three-and-one-quarter inches and were disposed along parallel border lines one inch apart. Moreover, the posts 77 were one-half inch in height (measured from the bottom of the upper surface of the post to the bottom of the cover) and the recesses were three-quarters of an inch in diameter and one-fourth of an inch in depth.

Th cover 72 may be used to support a prototype of a crystalline structure or a geometric configuration, and in particular, the posts 77 and recesses 78 may be employed as base supports for maintaining the spheres fitted thereon in predetermined angular relationship. More particularly, elaborate and complex prototypes of certain crystals embodying a particular angular relationship of the spheres provided by the posts 77 and recesses 78, such as the diamond crystal or the body-centered cubic lattice crystal, may be quickly and easily constructed on the cover 72 which also serves to close the top of the receptacle 71 to provide for facile transportation of the stored component parts of the educational device of the present invention. It should again be apparent that uniform dimensions of both the spheres and bars are necessary to accurately simulate the specific configuration and interrelationship of the atoms and bonds in the compound crystals described hereinbefore.

As indicated from the above description, the present invention provides an educational device comprising a plurality of simple spheres, interconnecting bars of both preselected and variable lengths, and a combination unit of spheres and bars capable of assembly in selected arrangements to build prototypes of various natural crystallographic structures simulating non-polar or value bonds as well as polar or ionic bonds occurring in nature. Large prototype structures become extremely precise because of the close tolerances in the manufacturing of the various spheres and bars. Furthermore, the educational device may be utilized to build various geometrical configurations, as for example the compound polyhedrons. In addition, there has been described a method for manufacturing an interconnecting magnetic bar provided with magnetic material disposed within a non-magnetic insulating material to localize the flux distribution at the ends of the interconnecting bars, thereby increasing the ability of the interconnecting bar to attract and retain the spheres at its ends in spaced apart relation. Also, there is employed a carrying case having a cover adapted to function as a support base for a prototype of crystalline construction including atoms having fixed angular bonds.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. For use in an educational device, a combination unit which comprises a hollow magnetically attractive sphere having an elongated bar fixedly secured thereto and housing a magnetic material, said sphere having an opening defined in its surface, supporting means within said hollow sphere, and an elongated bar means pivotally secured to said supporting means and housing a magnetic material, one of said means having a portion extending through said opening.

2. An educational device comprising a plurality of spherical, magnetically attractive members of substantially the same diameter and a plurality of rigid interconnecting bars of substantially the same length with the ends thereof generally complementary to the surface of the spherical members, each bar formed of a sheath of magnetic material and housing magnetic means and having its ends in engagement with the surface of said spherical members, whereby the bars are freely slidable over the surface of the spheres.

3. An educational device comprising a plurality of spherical, magnetically attractive members of substantially the same diameter and a plurality of rigid interconnecting bars of substantially the same length with the ends thereof complementary to the surface of the spherical members, each bar housing magnetic means and having magnetic material at its ends for engagement with the surface of said spherical members, whereby the bars are freely slidable over the surface of the spheres.

4. An educational device as set forth in claim 2 above wherein said magnetic means includes at least one magnet with the sheath.

5. An educational device as set forth in claim 4 above wherein said bars additionally include a sheath of non-magnetic material spacing said magnet within said sleeve.

6. An educational device as set forth in claim 2 above wherein said magnetic means comprises a pair of magnets, and wherein said bars additionally include a pair of ferrules of magnetic material disposed within said sheath for seating said magnets.

References Cited in the file of this patent

UNITED STATES PATENTS

| | | |
|---|---|---|
| 242,821 | Farmer | June 14, 1881 |
| 1,931,102 | Casper | Oct. 17, 1933 |
| 2,227,919 | Arnoff | Jan. 7, 1941 |
| 2,434,973 | Williams | Jan. 27, 1948 |
| 2,499,241 | Courtot | Feb. 28, 1950 |
| 2,570,625 | Zimmerman et al. | Oct. 9, 1951 |
| 2,598,831 | Ramey | June 3, 1952 |
| 2,648,157 | Wilson et al. | Aug. 11, 1953 |
| 2,665,913 | Hlavac | Jan. 12, 1954 |
| 2,716,292 | Benjamin | Aug. 30, 1955 |
| 2,739,697 | Kuddes | Mar. 27, 1956 |
| 2,846,809 | Majewski | Aug. 12, 1958 |

FOREIGN PATENTS

| | | |
|---|---|---|
| 428,082 | Great Britain | May 7, 1935 |
| 597,762 | Great Britain | Feb. 3, 1948 |

OTHER REFERENCES

"Molecular Models . . ." (Corey et al.), The Rev. of Sfc. Inst., vol. 24, No. 8; August 1953 (pp. 623 and 625 relied on).

UNITED STATES PATENT OFFICE
CERTIFICATION OF CORRECTION

Patent No. 2,970,388                    February 7, 1961

Edward H. Yonkers

It is hereby certified that error appears in the above numbered patent requiring correction and that the said Letters Patent should read as corrected below.

Column 3, line 40, for "a" read -- at --; line 42, for "th" read -- the --; line 43, for "interpenetrtaion" read -- interpenetration --; line 54, for "eductaional" read -- educational --; column 7, line 23, for "Th" read -- The --; column 8, line 36, for "with" read -- within --; line 38, for "sheath" read -- sleeve --; line 39, for "sleeve" read -- sheath --.

Signed and sealed this 11th day of July 1961.

(SEAL)
Attest:

ERNEST W. SWIDER                    DAVID L. LADD
Attesting Officer                    Commissioner of Patents